(12) United States Patent
Shinkai et al.

(10) Patent No.: US 10,813,267 B2
(45) Date of Patent: Oct. 27, 2020

(54) CONTROL APPARATUS FOR AUTOMATIC TRAVELING VEHICLE

(71) Applicant: Kubota Corporation, Osaka-shi (JP)

(72) Inventors: Atsushi Shinkai, Sakai (JP); Kazuo Sakaguchi, Amagasaki (JP); Kotaro Yamaguchi, Amagasaki (JP); Hiroki Suga, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 65 days.

(21) Appl. No.: 15/956,758

(22) Filed: Apr. 19, 2018

(65) Prior Publication Data

US 2018/0310461 A1  Nov. 1, 2018

(30) Foreign Application Priority Data

Apr. 26, 2017  (JP) .................................. 2017-087348

(51) Int. Cl.
*A01B 69/00* (2006.01)
*B62D 6/00* (2006.01)
(Continued)

(52) U.S. Cl.
CPC .......... *A01B 69/001* (2013.01); *A01B 69/008* (2013.01); *B62D 6/00* (2013.01);
(Continued)

(58) Field of Classification Search
CPC ...... A01B 69/001; A01B 69/008; B62D 6/00; G05D 1/0212
See application file for complete search history.

(56) References Cited

U.S. PATENT DOCUMENTS

| 5,555,503 A | * | 9/1996 | Kyrtsos | ................... G01S 19/11 342/357.24 |
| 5,646,855 A | * | 7/1997 | Jones | ................... G05D 1/0206 701/467 |

(Continued)

FOREIGN PATENT DOCUMENTS

JP   2002-358122   12/2002

OTHER PUBLICATIONS

Larsen et al., "Precision navigation with GPS", Computers and Electronics in Agriculture, Oct. 1, 1994, pp. 85-95, vol. 11, No. 1, XP026648363.

(Continued)

*Primary Examiner* — Nicholas K Wiltey
*Assistant Examiner* — Tiffany K Luu
(74) *Attorney, Agent, or Firm* — Mori & Ward, LLP

(57) ABSTRACT

A control apparatus for an automatic traveling vehicle includes a position sensor and circuitry. The position sensor is to detect a vehicle position of the automatic traveling vehicle. The circuitry is configured to control the automatic traveling vehicle to travel along a first route, a first turn route connected to the first route, a straight route connected to the first turn route, a second turn route connected to the straight route, and a second route connected to the second turn route in this order, and to calculate the straight route extending from a reference point on the first turn route to the second turn route such that the straight route is tangent to the second turn route.

7 Claims, 9 Drawing Sheets

(51) Int. Cl.
  *G05D 1/02* (2020.01)
  *G01S 19/14* (2010.01)
  *A01B 69/04* (2006.01)
  *G09B 29/10* (2006.01)
  *G01S 19/47* (2010.01)

(52) U.S. Cl.
  CPC ............ *G01S 19/14* (2013.01); *G05D 1/0212* (2013.01); *G05D 1/0278* (2013.01); *G01S 19/47* (2013.01); *G05D 2201/0201* (2013.01); *G09B 29/10* (2013.01)

(56) References Cited

U.S. PATENT DOCUMENTS

| | | | | |
|---|---|---|---|---|
| 6,128,574 | A * | 10/2000 | Diekhans | A01B 79/005 701/410 |
| 2005/0187705 | A1 * | 8/2005 | Niwa | G01C 21/26 701/448 |
| 2006/0167600 | A1 * | 7/2006 | Nelson, Jr. | A01B 69/008 701/23 |
| 2007/0255470 | A1 * | 11/2007 | Diekhans | A01B 69/008 701/50 |
| 2008/0208461 | A1 * | 8/2008 | Gharsalli | G01C 21/32 701/425 |
| 2009/0118904 | A1 * | 5/2009 | Birnie | G01C 21/00 701/41 |
| 2010/0185366 | A1 * | 7/2010 | Heiniger | A01B 69/008 701/50 |
| 2012/0296529 | A1 | 11/2012 | Peake et al. | |
| 2013/0282224 | A1 * | 10/2013 | Yazaki | A01D 34/008 701/24 |
| 2013/0304300 | A1 * | 11/2013 | Peake | B62D 15/025 701/23 |
| 2014/0074340 | A1 * | 3/2014 | Wilson | A01B 69/008 701/25 |
| 2014/0149014 | A1 * | 5/2014 | Grothe | G01C 21/32 701/93 |
| 2016/0313735 | A1 * | 10/2016 | Berkemeier | G05D 1/0212 |
| 2017/0144702 | A1 * | 5/2017 | Dang | A01B 69/008 |
| 2017/0202131 | A1 * | 7/2017 | Bunderson | A01B 69/008 |
| 2018/0284769 | A1 * | 10/2018 | Wang | B60W 30/06 |

OTHER PUBLICATIONS

Extended European Search Report for corresponding EP Application No. 18000376.6-1006, dated Sep. 28, 2018.

* cited by examiner

CONTROL APPARATUS FOR AUTOMATIC TRAVELING VEHICLE

CROSS-REFERENCE TO RELATED APPLICATIONS

The present application claims priority under 35 U.S.C. § 119 to Japanese Patent Application No. 2017-087348, filed Apr. 26, 2017. The contents of this application are incorporated herein by reference in their entirety.

BACKGROUND OF THE INVENTION

Field of the Invention

The present invention relates to a control apparatus for an automatic travelling vehicle and a control method for an automatic travelling vehicle.

Discussion of the Background

JP 2002-358122 A discloses an agricultural work vehicle including a global positioning system (GPS) receiver that receives radio waves from a GPS satellite. The agricultural work vehicle automatically travels farmland so that a midpoint between front wheels follows a target route, based on a current position calculated. The agricultural work vehicle performs automatic straight-forward travel control for travel along a straight target route and automatic turn control for travel along a curved target route. In the automatic turn control, a location deviation and a bearing deviation are calculated with respect to a tangent vector drawn from a point at which a straight line extending from the center of a turning circle as a target route to the midpoint between the front wheels intersects with the turning circle. The agricultural work vehicle is subjected to steering based on a command value for a hydraulic steering valve, the command value being calculated from the location deviation and bearing deviation calculated. The agricultural work vehicle thus performs automatic turn travel along a curved target route being the turning circle. In the farmland, the agricultural work vehicle frequently performs work and travel through a transfer from one straight target route to another straight target route via a 180- or 90-degree angle curved target route.

SUMMARY OF THE INVENTION

According to one aspect of the present invention, a control apparatus for an automatic traveling vehicle includes a position sensor and circuitry. The position sensor is to detect a vehicle position of the automatic traveling vehicle. The circuitry is configured to control the automatic traveling vehicle to travel along a first route, a first turn route connected to the first route, a straight route connected to the first turn route, a second turn route connected to the straight route, and a second route connected to the second turn route in this order, and to calculate the straight route extending from a reference point on the first turn route to the second turn route such that the straight route is tangent to the second turn route.

According to another aspect of the present invention, a control apparatus for an automatic traveling vehicle includes a position sensor, a travel state sensor, and circuitry. The position sensor is to detect a vehicle position of the automatic traveling vehicle. The travel state sensor is to detect a traveling direction of the automatic traveling vehicle at the vehicle position. The circuitry is configured to control the automatic traveling vehicle to travel along a first route, a first turn route connected to the first route in this order. The circuitry is configured to calculate a candidate straight route connecting the vehicle position that is periodically detected by the position sensor while the automatic traveling vehicle travels along the first turn route and a circle connected to a second route which is targeted after the first turn route such that the candidate straight route is tangent to the circle. The circuitry is configured to determine, based on an angle made by the traveling direction and the candidate straight route, whether the candidate straight route is a straight route along which the automatic traveling vehicle is to travel after the first turn route. The circuitry is configured to calculate a second turn route along the circle between the straight route and the second route. The circuitry is configured to control the automatic traveling vehicle to travel along the straight route, the second turn route, and the second route in this order.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
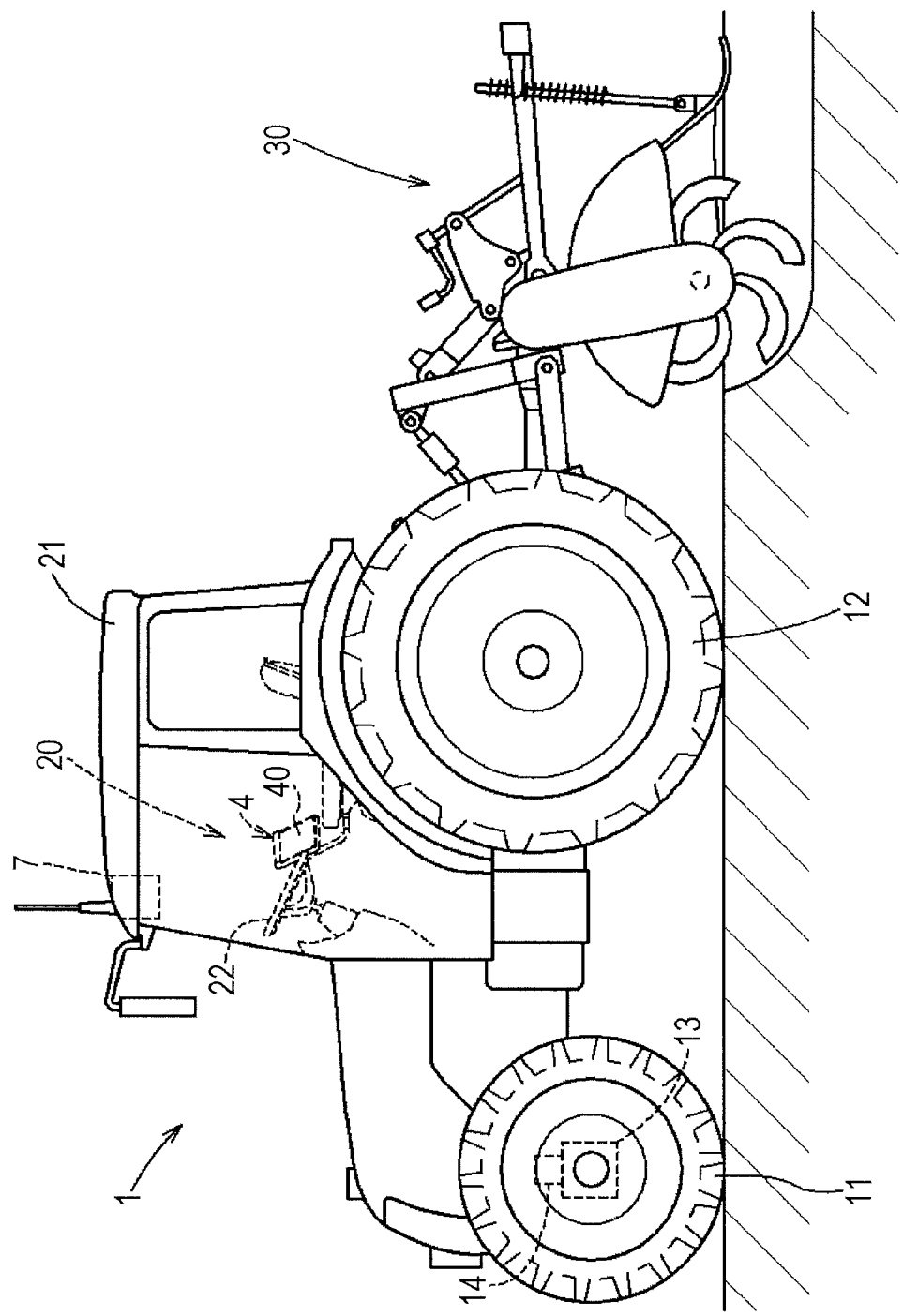
FIG. 1 is a side view of a tractor equipped with an automatic steering system.

The embodiments will now be described with reference to the accompanying drawings, wherein like reference numerals designate corresponding or identical elements throughout the various drawings.

With reference to the drawings, next, a description will be given of an automatic steering system according to an embodiment of the present invention. FIG. 1 is a side view of a tractor being an example of a vehicle equipped with the automatic steering system. As illustrated in FIG. 1, in the tractor, a cab 20 is disposed at a center of a vehicle body 1 supported by front wheels 11 and rear wheels 12. A cultivating device 30 of a rotary type being a work device is mounted to the back side of the vehicle body 1 with a lifting mechanism of a hydraulic type. The front wheels 11 serve as driving wheels, and a traveling direction of the tractor is changed by changing a steering angle of the front wheels 11. The steering angle of the front wheels 11 is changed by actuating a steering mechanism 13. The steering mechanism 13 includes a steering motor 14 for automatic steering. In manual travel, the front wheels 11 are steered by operating a steering wheel 22 disposed in the cab 20. The tractor includes a cabin 21 that is provided with a satellite positioning module 7 as a positioning module to enable a current position detecting function. A satellite antenna that constitutes a part of the satellite positioning module 7 to receive a global navigation satellite system (GNSS) signal (including a global positioning system (GPS) signal) is mounted on a ceiling region of the cabin 21. For complementation of satellite navigation, the satellite positioning module 7 may include an inertial navigation module including a gyro/acceleration sensor and a magnetic azimuth sensor. The inertial navigation module may be installed at a place different from a place where the satellite positioning module 7 is installed. In this embodiment, a data processing terminal 4 of a general-purpose type is installed on the cab 20. The data processing terminal 4 may be a tablet computer including a touch panel 40. That is, the data processing terminal 4 includes a CPU 4P and a memory 4M. The data processing terminal 4 receives input of various operations from a driver through the touch panel 40. In addition, the data processing terminal 4 gives various kinds of information to the driver through the touch panel 40.

Figure 2:
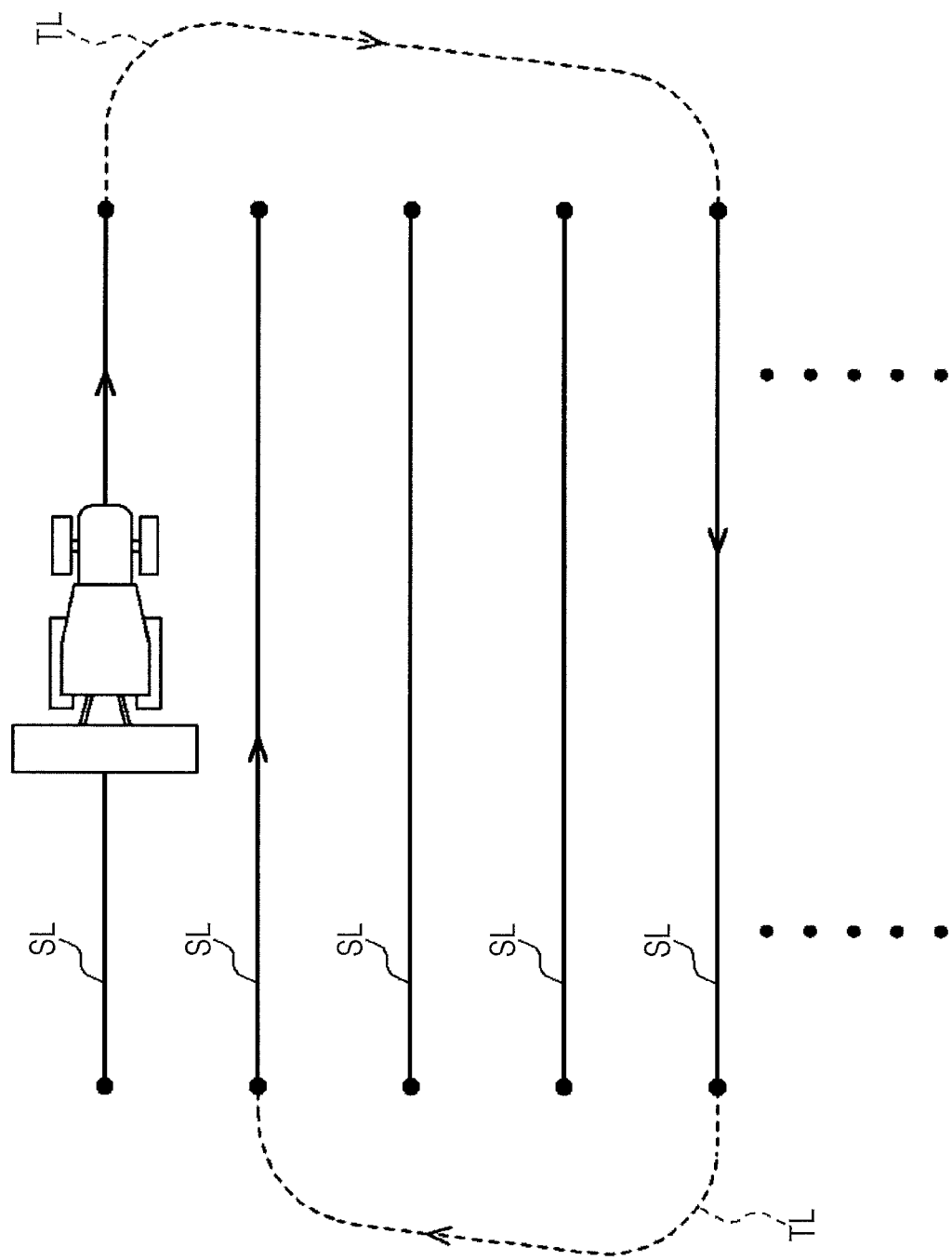
FIG. 2 is a schematic view of a part of a route on which the tractor subjected to automatic steering travels.

FIG. 2 is a schematic view of exemplary work and travel of the tractor subjected to automatic steering. The tractor is subjected to automatic steering to repeatedly perform straight-forward travel and turn travel. The tractor performs the straight-forward travel to travel along a straight route SL (see FIG. 2). The tractor performs the turn travel to travel along a curved route TL (see FIG. 2) for a transfer from a first straight route to a second straight route. The turn travel is typically performed such that one or more straight routes are sandwiched between the first straight line and the second straight line. In straight-forward travel, the tractor lifts down the cultivating device 30 to perform cultivating work. In turn travel, the tractor lifts up the cultivating device 30 to halt the cultivating work.

Figure 3:
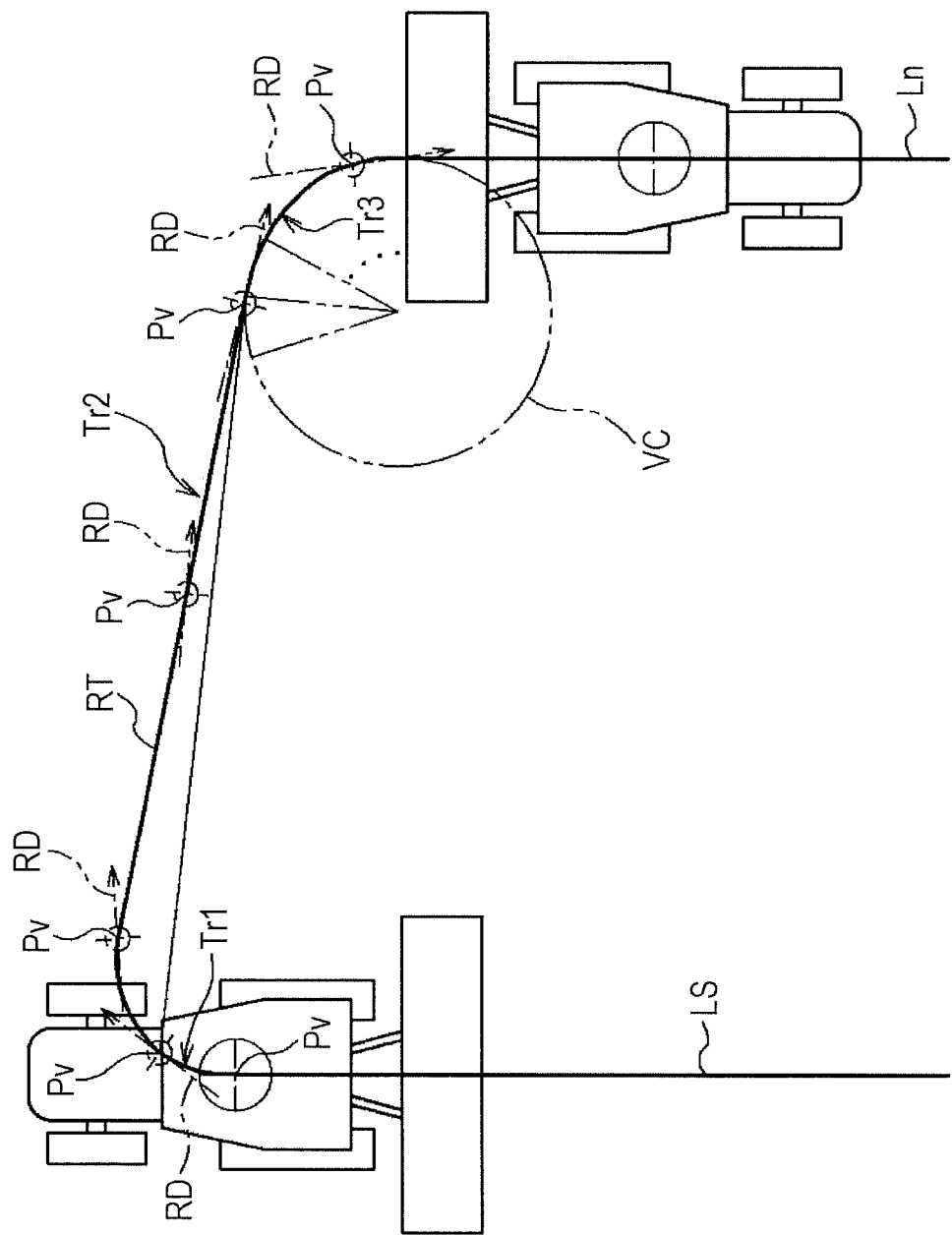
FIG. 3 is a schematic view of the tractor performing turn travel from a previous route to a subsequent route based on the automatic steering.

FIG. 3 is a schematic view of exemplary automatic steering in turn travel. In this example, the tractor performs turn travel for a transfer from a straight route Ls (i.e., a source) to a straight route Ln (i.e., a destination). As used herein, a straight route being a source is referred to as a previous route Ls, and a straight route being a destination is referred to as a subsequent route Ln.

The tractor arrives at an end position of the previous route Ls and then performs first turn travel to head for the subsequent route Ln. The tractor performs the first turn travel along a track Tr1 (a first turn route Tr1). In addition, the tractor calculates a virtual turning circle VC tangent to a start position of the subsequent route Ln or a position near the start position on an extension from the subsequent route Ln, on a side nearer to the previous route Ls. The tractor also calculates a tangent extending from a vehicle body reference point Pv of the tractor performing the first turn travel to the virtual turning circle VC. The vehicle body reference point Pv is substantially a central point of the tractor, but may be set at any position. A traveling direction RD corresponds to an orientation of a line directed to a direction of the traveling tractor, through the vehicle body reference point Pv. In course of the performance of the first turn travel, when an angle between the tangent calculated and the traveling direction is within a first predetermined value, the tangent is set at a reference tangent RT. After setting the reference tangent RT, the tractor terminates the first turn travel and then performs shift travel along the reference tangent RT set at a target route. The tractor performs the shift travel along a track Tr2 (a straight route Tr2). In course of the performance of the shift travel, when the vehicle body reference point Pv of the tractor approaches the virtual turning circle VC, the tractor terminates the shift travel and then performs second turn travel along the virtual turning circle VC. The tractor performs the second turn travel along a track Tr3 (a second turn route Tr3). In course of the performance of the second turn travel, when the vehicle body reference point Pv of the tractor approaches the start position of the subsequent route Ln or a position near the start position on the extension from the subsequent route Ln, the tractor terminates the second turn travel and then performs straight-forward travel along the subsequent route Ln set at a target route.

Figure 4:
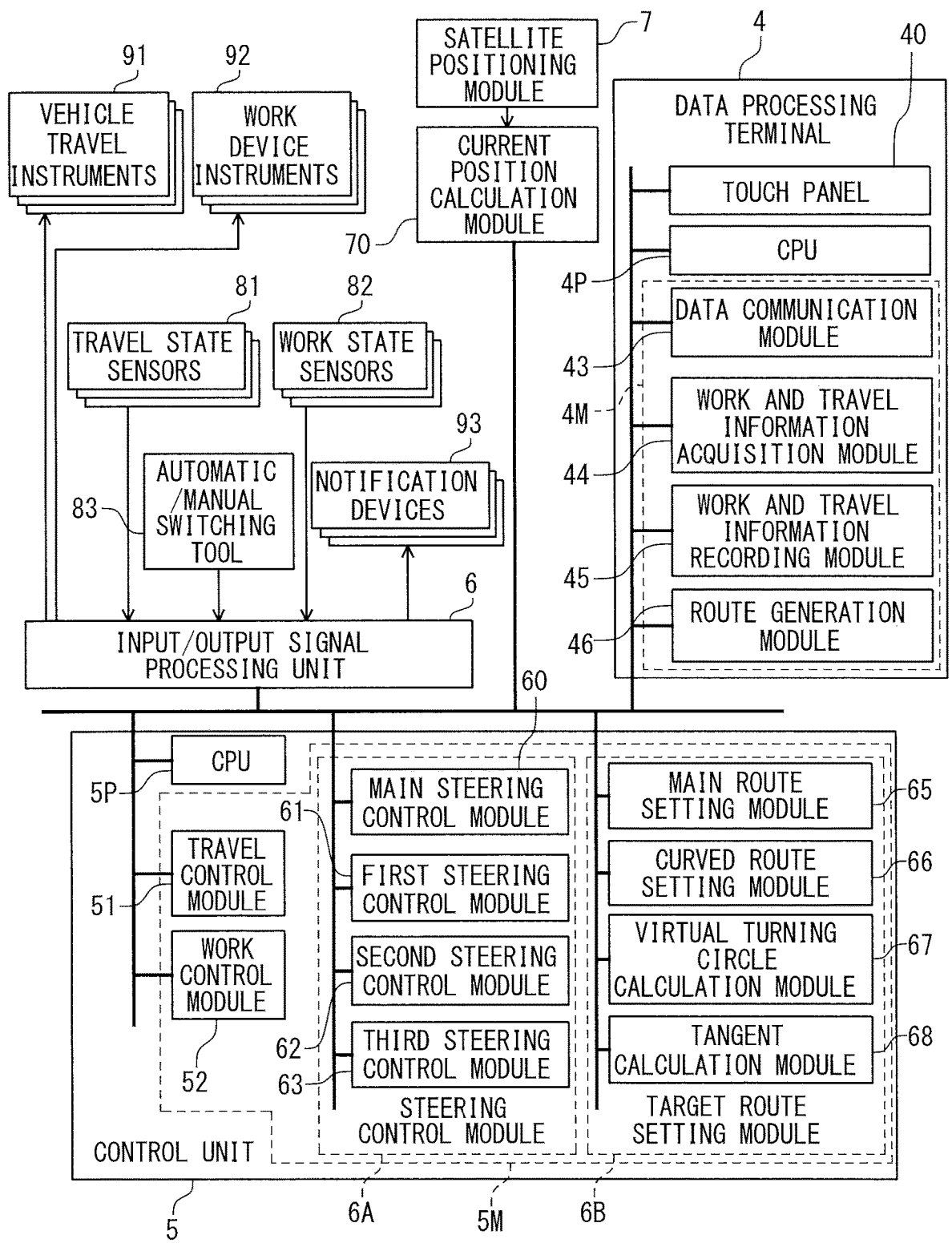
FIG. 4 illustrates a structure of a control system for travel of the tractor subjected to the automatic steering.

Next, a concrete and specific description will be given of the turn travel described above. FIG. 4 is a functional block diagram of a control system for automatic travel of the tractor. The control system includes the data processing terminal 4, a control unit 5, and an input/output signal processing unit 6. The data processing terminal 4, the control unit 5, and the input/output signal processing unit 6 are connected to one another via an on-vehicle local area network (LAN) or a control signal line to enable data exchange. The data processing terminal 4 may be detached from the tractor and may be used at the outside of the tractor. In this case, data exchange between the control unit 5 and the data processing terminal 4 is achieved by wireless communications.

The input/output signal processing unit 6 serves as an input/output interface and has a function of establishing a connection with a data/signal line, an on-vehicle LAN, a wireless communication line, or a wired communication line. Vehicle travel instruments 91, work device instruments 92, notification devices 93, and the like are connected to the data processing terminal 4 and the control unit 5 via the input/output signal processing unit 6. The input/output signal processing unit 6 therefore has, for example, an output signal processing function, an input signal processing function, and a communication function for data transmission using a data/signal line, a wireless line, or a wired line. The vehicle travel instruments 91 include, for example, the steering motor 14 of the steering mechanism 13, an engine control instrument, and a transmission instrument. The work device instruments 92 include, for example, a power transmission clutch of the cultivating device 30 being a work device, and a lifting cylinder of the lifting mechanism. The notification devices 93 include, for example, a meter, a buzzer, a lamp, and a liquid crystal display. In addition, travel state sensors 81, work state sensors 82, and switches and buttons such as an automatic/manual switching tool 83 are connected to the input/output signal processing unit 6.

A current position calculation module 70 receives positioning data from the satellite positioning module 7, processes the positioning data, and outputs a current position being a position on map coordinates or field coordinates at a predetermined portion of the tractor. The current position calculation module 70 sends the current position to each of the control unit 5 and the data processing terminal 4. In particular, the control unit 5 performs automatic steering control based on the current position.

The data processing terminal 4 includes the touch panel 40, a data communication module 43, a work and travel information acquisition module 44, a work and travel information recording module 45, and a route generation module 46. The touch panel 40 gives various kinds of information to a user and receives input of operations from the user. For example, the data communication module 43, the work and travel information acquisition module 44, the work and travel information recording module 45, and the route generation module 46 can be programs stored in the memory 4M and executed by the CPU 4P to perform functions of the data communication module 43, the work and travel information acquisition module 44, the work and travel information recording module 45, and the route generation module 46, respectively.

The work and travel information acquisition module 44 acquires work and travel information including, for example, a map position and a topographic feature of a field being work land, and a kind of work to be performed on the field, from an external computer or a storage medium via the data communication module 43. The work and travel information recording module 45 records the acquired work and travel information on a memory. The user may directly input the map position and topographic feature of the field and the kind of work to be performed on the field, using an information input assistant function to be executed through the touch panel 40.

The route generation module 46 refers to field information including, for example, a topographic feature of a field where the vehicle will perform work, executes a route generation program that is installed in advance, and generates a route. The route generation module 46 may receive a route that is externally generated, via the data communication module 43 and control the received route.

The control unit 5 includes a CPU 5P, a memory 5M, a travel control module 51, a work control module 52, a steering control module 6A, and a target route setting module 6B as basic control function modules that cause the tractor to perform automatic work and travel. For example, the travel control module 51, the work control module 52, the steering control module 6A, and the target route setting module 6B are program modules stored in the memory 5M to be executed by the CPU 5P to perform functions of the travel control module 51, the work control module 52, the steering control module 6A, and the target route setting module 6B, respectively.

The travel control module 51 has a manual travel control mode and an automatic travel control mode. In the manual travel control mode, the travel control module 51 transmits control signals to the vehicle travel instruments 91, based on operations of an accelerator pedal and a gear change lever by a driver. In the automatic travel control mode, the travel control module 51 causes the tractor to travel at an engine speed and a vehicle speed each specified by automatic travel parameters. In addition, the travel control module 51 outputs an operation control signal to the steering motor 14, based on a steering command calculated by the steering control module 6A. The steering control module 6A calculates the steering command to cause the tractor to travel along a target route set by the target route setting module 6B. The automatic/manual switching tool 83 switches between the manual travel control mode and the automatic travel control mode. Depending on a situation, such mode switching is automatically made in accordance with a work and travel state of the tractor.

The work control module 52 has an automatic work control mode and a manual work control mode. In the manual work control mode, the work control module 52 transmits control signals to the work device instruments 92, based on operations of work operation tools by the driver. In the automatic work control mode, the work control module 52 transmits signals to the work device instruments 92, based on automatic work parameters. The work device instruments 92 keep an orientation of the cultivating device 30, based on the automatic work parameters, and lift up/down the cultivating device 30.

The steering control module 6A generates a steering command for causing the tractor to follow a target route, based on a target route set by the target route setting module 6B, a current position sent from the current position calculation module 70, and a traveling direction calculated based on a successive current position. It is assumed in the following description that the current position is at the same position as the vehicle body reference point Pv. Each of a main steering control module 60 of the steering control module 6A and a main route setting module 65 of the target route setting module 6B is mainly used for straight-forward travel to cause the tractor to follow a straight target route (including a target route curved at a larger radius of curvature).

Particularly, in order to perform the automatic steering control to cause the tractor to transfer from the previous route Ls to the subsequent route Ln by the turn travel as described above with reference to FIG. 2, the steering control module 6A further includes a first steering control module 61, a second steering control module 62, and a third steering control module 63. Likewise, the target route setting module 6B further includes a curved route setting module 66, a virtual turning circle calculation module 67, and a tangent calculation module 68.

Figure 5:
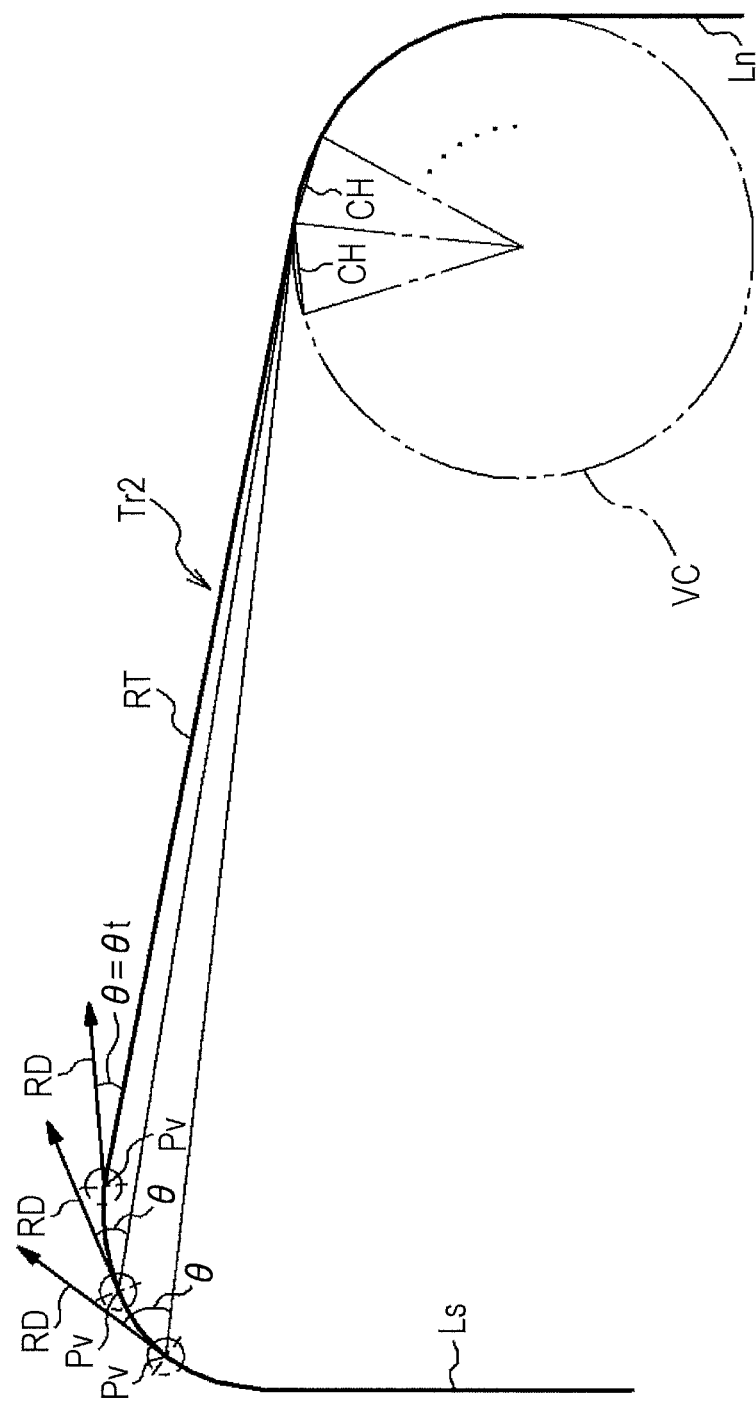
FIG. 5 is a schematic view of the tractor shifting from first turn travel to shift travel.

As illustrated in FIG. 5, when the tractor arrives at the previous route Ls, the first steering control module 61 performs steering control for first turn travel on the tractor to cause the tractor to leave the previous route Ls and head for the subsequent route Ln (see FIG. 3). The steering control for the first turn travel employs a minimum turning radius of the tractor.

As illustrated in FIGS. 3 and 5, when the tractor arrives at the previous route Ls, the virtual turning circle calculation module 67 calculates a virtual turning circle VC to be used as a target route for second turn travel. The tractor performs the second turn travel to enter the subsequent route Ln. The virtual turning circle VC is tangent to the start position of the subsequent route Ln or the extension from the subsequent route Ln, on a side nearer to the previous route Ls, and has a radius corresponding to the minimum turning radius of the tractor in this embodiment. In addition, the virtual turning circle calculation module 67 divides the virtual turning circle VC calculated, into a plurality of arcs to obtain a route line segment extending between two ends of each arc. In this embodiment, the virtual turning circle VC is equally divided into 36 arcs each having a central angle of 10°, so that 36 chords, that is, 36 successively continuous route line segments CH are calculated.

In course of the performance of the first turn travel, the tangent calculation module 68 calculates a tangent extending from a vehicle body reference point Pv to the virtual turning circle VC at predetermined time intervals or predetermined traveling distance intervals (FIG. 5 illustrates three tangents (candidate straight routes)), and also calculates an angle θ (see FIG. 5) between each tangent and a steering direction (i.e., a traveling direction) of the tractor. The tangent calculation module 68 sets, at a reference tangent RT, a tangent at the time when the angle θ is within a first predetermined angle θt that is set in advance, and records the reference tangent RT. In this embodiment, the first predetermined angle θt is 30°.

When the reference tangent RT is calculated, the third steering control module 63 is activated, and the steering control by the first steering control module 61 is terminated. Since the reference tangent RT is a straight line, the steering control by the third steering control module 63 is substantially similar to steering control for such travel as to follow a straight target route. In this embodiment, the travel to follow the reference tangent RT is referred to as shift travel.

Figure 6:
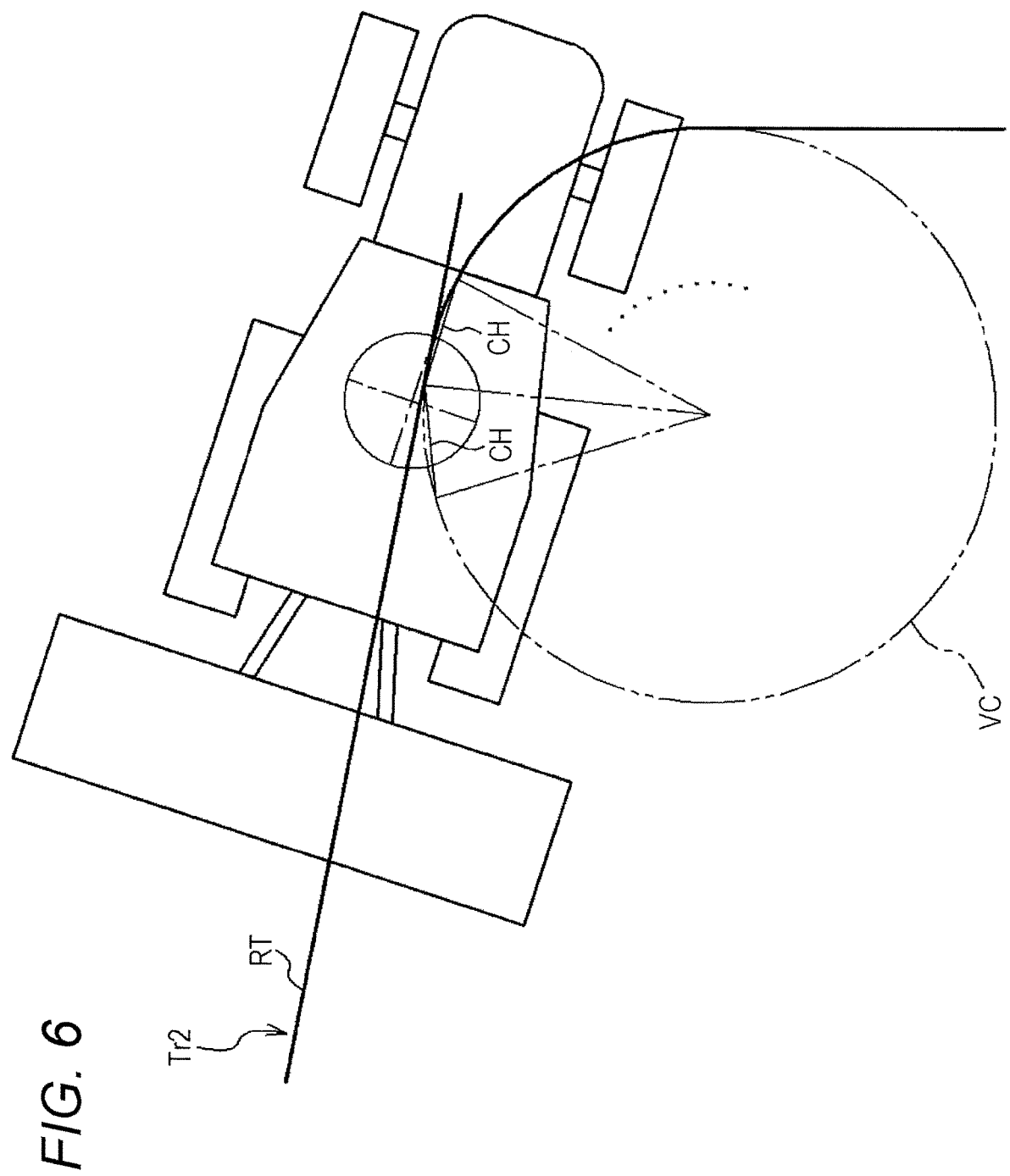
FIG. 6 is a schematic view of the tractor shifting from the shift travel to second turn travel.
Figure 7:
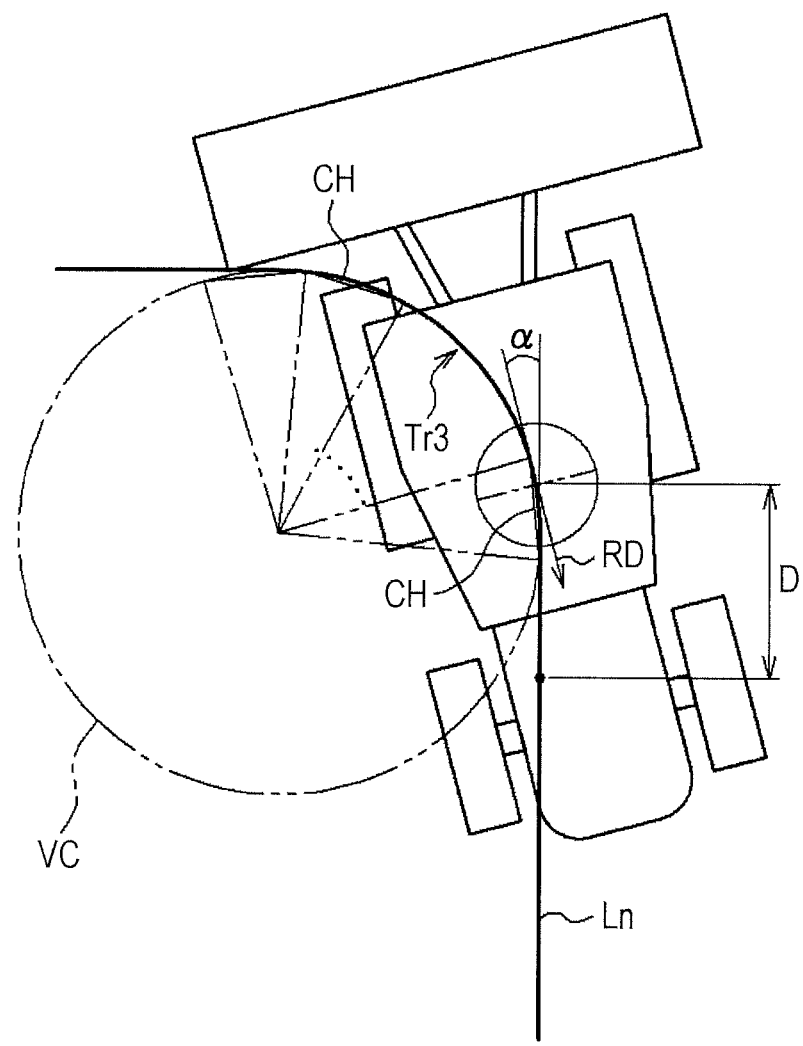
FIG. 7 is a schematic view of the tractor shifting from the second turn travel to straight-forward travel.

As illustrated in FIGS. 3, 6, and 7, the second steering control module 62 performs steering control for a shift from the straight shift travel to second turn travel for a transfer to the subsequent route Ln. The shift from the shift travel controlled by the third steering control module 63 to the second turn travel controlled by the second steering control module 62 is made immediately before, for example, one second before the vehicle body reference point Pv reaches a point of tangency of the reference tangent RT. At this timing, the second steering control module 62 selects a nearest one of the route line segments CH and causes the tractor to perform the second turn travel. The tractor thus follows the route line segment CH selected. The second steering control module 62 successively selects the route line segments CH and performs steering control to cause the tractor to follow each route line segment CH. The second steering control module 62 substantially performs steering control on the tractor to cause the tractor to perform second turn travel along the virtual turning circle VC. At this time, the second steering control module 62 performs speed reduction control according to a deviation from each route line segment CH. The second steering control module 62 also performs speed reduction control according to a difference between a current steering angle and a target steering angle. In addition, the second steering control module 62 calculates a distance D between the vehicle body reference point of the tractor and the subsequent route Ln, and an angle α between the traveling direction of the tractor and the subsequent route Ln (see FIG. 7).

The second turn travel controlled by the second steering control module 62 is terminated on conditions that as illustrated in FIG. 7, the angle α between the traveling direction of the tractor and the subsequent route Ln is within a second predetermined angle αt and the distance D between the vehicle body reference point of the tractor and the subsequent route Ln (including the extension from the subsequent route Ln) is equal to or less than a predetermined distance. In this embodiment, the second predetermined angle αt is 20°, and the distance D is several tens of centimeters. When the conditions are satisfied, the second steering control module 62 causes the tractor to terminate the second turn travel, and the main steering control module 60 (additional control module) causes the tractor to resume the straight-forward travel. The tractor thus follows the subsequent route Ln set at a target route.

When the distance between the previous route Ls and the subsequent route Ln is short, the reference tangent RT becomes shorter, which enables a direct shift from the first turn travel to the second turn travel. In this case, the substantial shift travel controlled by the third steering control module 63 is omitted. Even in this case, however, a tangent is calculated by the tangent calculation module 68 and an angle between the tangent and the traveling direction is also calculated, for determining the timing of terminating the first turn travel.

Figure 8:
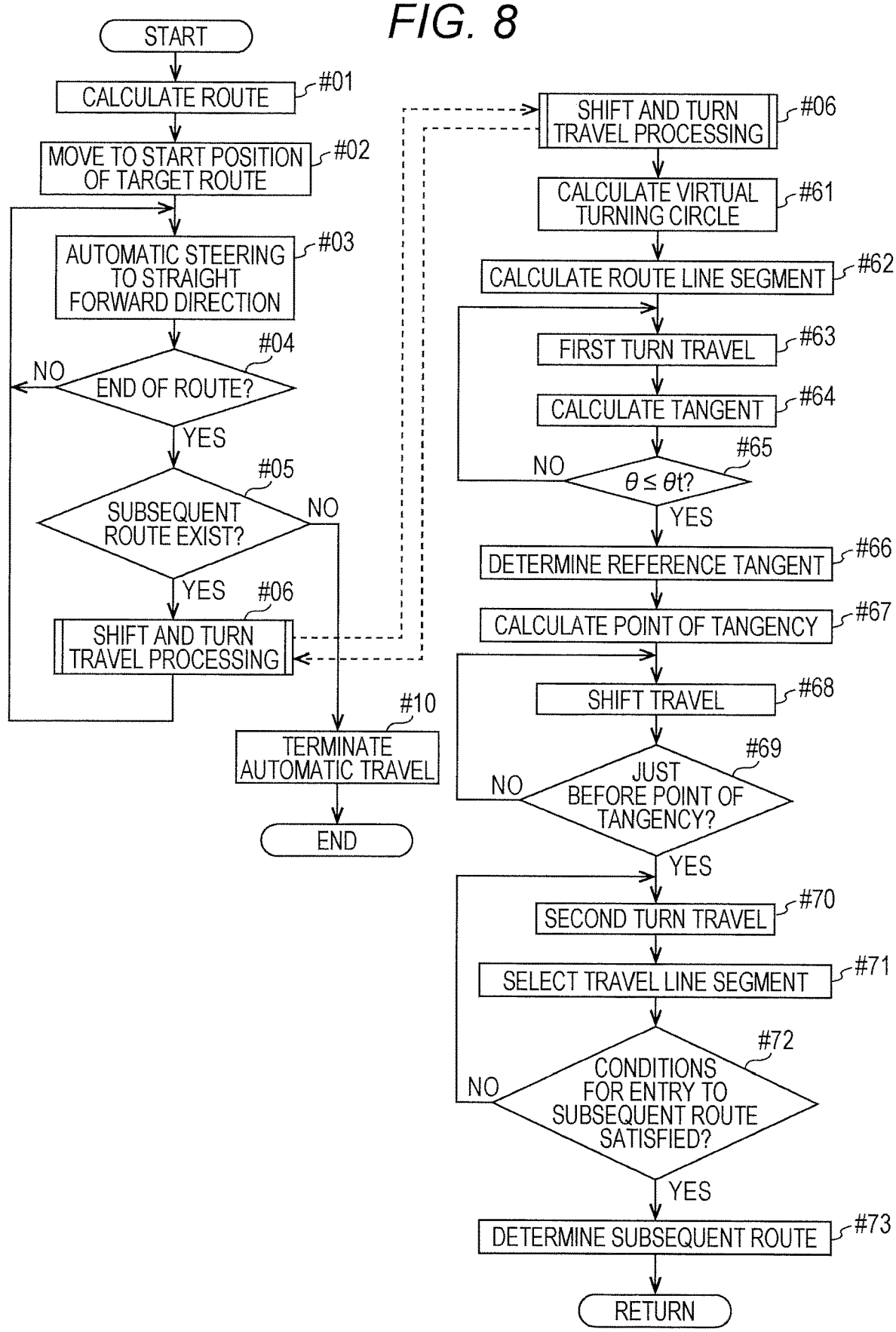
FIG. 8 is a flowchart of an exemplary and schematic flow of automatic steering control in turn travel.

With reference to a flowchart of FIG. 8, next, a description will be given of a schematic flow of automatic steering control in turn travel using the steering control module 6A and the target route setting module 6B each configured as described above.

First, straight routes such as those illustrated in FIG. 2 are calculated for a field where the tractor will perform work (#01). The tractor is moved to a start position of a first target route selected (i.e., one of the straight routes calculated) (#02). Next, the tractor starts straight-forward travel by automatic steering to follow the target route (#03). When the tractor arrives at an end position of the target route (Yes in #04), a determination is made as to whether there is a straight route on which the tractor will travel next (#05). When there is a straight route on which the tractor will travel next (Yes in #05), shift and turn travel processing is performed on the tractor to cause the tractor to transfer to the next route by turn travel (#06). In the shift and turn travel processing, the straight route on which the tractor has traveled until now corresponds to a previous route Ls, and the straight route on which the tractor will travel next corresponds to a subsequent route Ln. When there is no straight route on which the tractor will travel next (No in #05), automatic travel in the field is terminated (#10).

In the shift and turn travel processing, a virtual turning circle VC is calculated (#61). Next, a route line segment CH is calculated based on the virtual turning circle VC calculated (#62). The tractor performs first turn travel at a minimum turning radius (#63). At the same time, a tangent extending from a vehicle body reference position to the virtual turning circle VC is calculated (#64). A determination is made as to whether an angle θ between the tangent calculated and a traveling direction of the tractor is within a first predetermined angle θt (#65). When the angle θ is not within the first predetermined angle θt (No in #65), the first turn travel is continued (#63). When the angle θ is within the first predetermined angle θt (Yes in #65), a tangent at this time is set at a reference tangent RT, and position data indicative of the tangent is calculated (#66). In addition, position data indicative of a point of tangency of the tangent is calculated (#67).

Next, the third steering control module 63 causes the tractor to perform shift travel with the reference tangent RT set at a target route (#68). In the shift travel, when the vehicle body reference position of the tractor approaches just before the point of tangency of the reference tangent RT (Yes in #69), the tractor terminates the shift travel and then performs second turn travel (#70). In the second turn travel, route line segments CH each of which will be set at a target route are successively selected, and automatic steering is performed on the tractor to cause the tractor to follow each route line segment CH selected (#71). In course of the performance of the second turn travel, when conditions for entry of the tractor to the subsequent route Ln (angle α: within a second predetermined angle αt, distance D: equal to or less than a predetermined distance) are satisfied (Yes in #72), a shift to steering control with the subsequent route Ln set at a target route is determined (#73).

Figure 9:
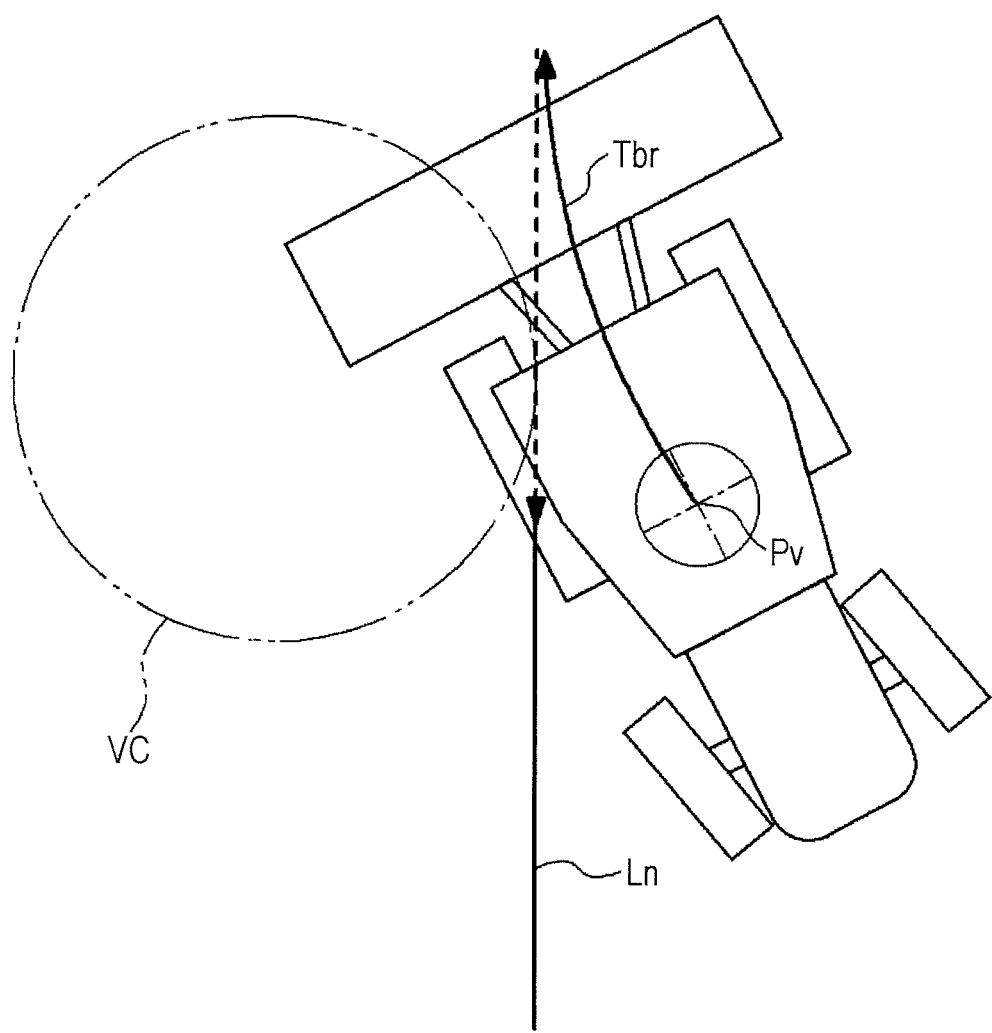
FIG. 9 is a schematic view of exemplary backward turn travel.

In the foregoing embodiment, the tractor deviating from a target route recovers the positional deviation by means of forward steering. In some cases, the tractor requires a recovery from a positional deviation by means of backward steering (i.e., travel in reverse). As illustrated in FIG. 9, when the direction and position of the tractor are deviated more than predetermined amounts and exceed preset limit values, respectively, before entry of the tractor to the subsequent route Ln in the second turn travel, the tractor is put into reverse to perform approach travel. The tractor thus approaches, in reverse, a target route being the extension from the subsequent route Ln. In this embodiment, the tractor performs backward turn travel. The tractor performs the backward turn travel along a track Tbr illustrated in FIG. 9. When the directional and positional deviations of the tractor are resolved by the backward turn travel, the tractor performs the second turn travel again. However, if the directional and positional deviations are not resolved although the deviation recovery processing by the backward steering is performed predetermined times, for example, three times, the shift and turn travel processing is halted.

OTHER EMBODIMENTS (1) In the foregoing embodiment, the control threshold values (condition values), such as the first and second predetermined angles set in advance by the target route setting module 6B, are settable at any values. The control threshold values may be changed in the course of work or may be externally set. Alternatively, the control threshold values may be automatically set based on a combination of a kind of work with a state of work land. The kind of work and the state of the work land are included in, for example, the work and travel information.

(2) The segmentation of the respective function modules in the functional block diagram of FIG. 4 is merely an example for convenience of the description. The various function modules may be freely integrated with one another or each function module may be freely divided into multiple function modules.

(3) In the foregoing embodiment, the tractor equipped with the cultivating device 30 being a work device is described as a work vehicle. The present invention is alternatively applicable to a tractor equipped with a work device different from the cultivating device 30 and is also applicable to a farm machine such as a combined harvester and thresher or a rice-planting machine, and a construction machine.

It should be noted that the configuration disclosed in the foregoing embodiment (including the other embodiments; the same applies hereinafter) may be applied in conjunction with the configurations disclosed in the other embodiments as long as no contradiction arises. The embodiments disclosed herein are merely illustrative. The present invention is not limited to the embodiments, and the embodiments may be appropriately modified without departing from the scope of the present invention.

INDUSTRIAL APPLICABILITY

The present invention is applicable to automatic steering for a vehicle that transfers from a previous route to a subsequent route by turn travel.

A preferable embodiment of the present invention provides an automatic steering system for a vehicle having a current position detecting function, the automatic steering system being configured to cause the vehicle to transfer from a previous route to a subsequent route by turn travel. The automatic steering system includes a first steering control module, a second steering control module, a third steering control module, a virtual turning circle calculation module, and a tangent calculation module. The first steering control module performs steering control for first turn travel on the vehicle to cause the vehicle to leave the previous route and head for the subsequent route. The second steering control module performs steering control for second turn travel on the vehicle to cause the vehicle to enter the subsequent route. The third steering control module performs steering control for shift travel on the vehicle to cause the vehicle to shift from the first turn travel to the second turn travel. The virtual turning circle calculation module calculates a virtual turning circle to be used as a target route for the second turn travel. The tangent calculation module calculates, as a target route for the shift travel, a tangent extending from a vehicle body reference point in the first turn travel to the virtual turning circle.

With this configuration, the virtual turning circle is used as a target route via which the vehicle finally enters the subsequent route being a destination. In addition, the first turn travel corresponding to a turn for leaving the previous route being a source is performed at any turning radius allowed by the vehicle. The shift travel shifting from the first turn travel to the second turn travel is travel to a straight forward direction since the target route is the tangent extending from the vehicle body reference point in the first turn travel to the virtual turning circle. The steering control for the shift travel is therefore easy to perform. In addition, the virtual turning circle may be an ideal turning circle along which the vehicle enters the subsequent route. The automatic steering system thus performs turn control on the vehicle to cause the vehicle to efficiently transfer from one straight target route to another straight target route, the straight target routes being distant from each other.

According to a preferable embodiment of the present invention, the tangent calculation module sets the tangent calculated, at a reference tangent when an angle between the tangent and a traveling direction of the vehicle is within a first predetermined angle, and the third steering control module performs the steering control with the reference tangent set at the target route for the shift travel. With this configuration, in the first turn travel, when an amount of misalignment between a traveling direction and an orientation of a tangent drawn from a current position to a virtual turning circle is reduced, the tangent is regarded as a reference tangent. The reference tangent is set at the target route for the shift travel. This results in a smooth shift from the first turn travel to the shift travel and a smooth shift from the shift travel to the second turn travel.

The use of the virtual turning circle as a target route makes calculation for steering control complicated. According to a preferable embodiment of the present invention, therefore, the virtual turning circle calculation module defines, as route line segments, chords obtained by dividing the virtual turning circle into a plurality of arcs, and the second steering control module performs the steering control while successively selecting the route line segments as the target route for the second turn travel. With this configuration, the target route for the second turn travel is straight. This configuration therefore simplifies calculation for the steering control and achieves commonality of steering control between the second turn travel and straight-forward travel.

According to a preferable embodiment of the present invention, steering control with the subsequent route set at a target route is performed when an angle between a traveling direction of the vehicle and the subsequent route is within a second predetermined angle and a distance between the vehicle body reference point and the subsequent route is equal to or less than a predetermined distance. With this configuration, the vehicle performs the second turn travel with line segments successively extracted from a group of line segments (preferably, chords with a central angle ranging from 20° to 45°) obtained from a virtual turning circle, the line segments being set at a target route for the second turn travel. When deviations in distance and direction between the vehicle and the subsequent route are reduced, the subsequent route line segment is set at a target route for a transfer to the subsequent route. This results in a smooth shift from the second turn travel to travel on the subsequent route.

As described above, the first turn travel corresponding to the turn for leaving the previous route being a source is performed at any turning radius allowed by the vehicle. Preferably, the first turn travel is performed at a minimum turning radius of the vehicle. This configuration is advantageous since a traveling distance in the first turn travel becomes short.

When a distance between the previous route and the subsequent route becomes short and a length of the reference tangent falls below a preset lower limit value, the vehicle enables a direct shift from the first turn travel to the second turn travel and has no necessity of the shift travel. According to a preferable embodiment of the present invention, therefore, the vehicle directly shifts from the first turn travel to the second turn travel without being subjected to the steering control by the third steering control module when a length of a first tangent calculated by the tangent calculation module falls below a lower limit value.

When the ground on which the vehicle travels has irregularities or is muddy, an unexpected vehicle movement such as a lateral slip occurs, which may cause a considerable deviation of a position of the vehicle from a target route. In such a case, it is difficult to return the position of the vehicle to the target route in a short time only by forward travel of the vehicle. Particularly, an agricultural work vehicle such as a tractor or a combined harvester and thresher is required to halt work at an end position of a previous route and immediately resume the work at a start position of a subsequent route. For this requirement, the vehicle needs to reliably enter the subsequent route at a correct position. Accordingly, if the position of the vehicle significantly deviates from a target route before entering the subsequent route, the positional deviation is preferably resolved by backward travel (i.e., turn travel in reverse). According to a preferable embodiment of the present invention, when the vehicle deviates from the subsequent route or an extension from the subsequent route beyond a limit value at termination of the second turn travel, the vehicle is put into reverse to perform approach travel approaching the subsequent route and is subjected to the steering control for the second turn travel again.

Obviously, numerous modifications and variations of the present invention are possible in light of the above teachings. It is therefore to be understood that within the scope of the appended claims, the invention may be practiced otherwise than as specifically described herein.

What is claimed is:

1. A control apparatus for an automatic traveling vehicle, comprising:
   a position sensor to detect a vehicle position of the automatic traveling vehicle;
   a travel state sensor to detect a traveling direction of the automatic traveling vehicle at a reference point of the automatic traveling vehicle; and
   circuitry configured to
      control the automatic traveling vehicle to travel along a first route, a first turn route connected to the first route, a reference tangent connected to the first turn route, a second turn route connected to the reference tangent, and a second route connected to the second turn route in this order,
      repeatedly calculate a tangent extending from the reference point on the first turn route to the second turn route as the automatic traveling vehicle travels along the first turn route such that the tangent straight route is tangent to the second turn route and an angle between the tangent and the traveling direction of the automatic traveling vehicle as the automatic traveling vehicle travels along the first turn route until the angle between the tangent and the traveling direction of the automatic traveling vehicle is less than or equal to a first threshold angle, and
      determine the tangent having the angle between the tangent and the traveling direction of the automatic traveling vehicle which is less than or equal to the first threshold angle as the reference tangent.

2. The control apparatus according to claim 1, further comprising:
   wherein the circuitry is configured to
      repeatedly calculate a distance between the second route and the reference point on the second turn route as the automatic traveling vehicle travels along the second turn route and an angle made by the second route and the traveling direction of the automatic traveling vehicle as the automatic traveling vehicle travels along the second turn route until the angle made by the second route and the traveling direction of the automatic traveling vehicle is less than or equal to a second threshold angle and the distance is equal to or less than a threshold distance, and
      control the automatic traveling vehicle to travel along the second route when the angle made by the second route and the traveling direction of the automatic traveling vehicle is less than or equal to the second threshold angle and the distance is equal to or less than the threshold distance.

3. The control apparatus according to claim 1, wherein radius of curvature of the first turn route is a minimum turning radius of the automatic traveling vehicle.

4. The control apparatus according to claim 1, wherein when the automatic traveling vehicle finishes traveling along the second turn route such that the vehicle position at which the automatic traveling vehicle finishes traveling along the second turn route deviates from the second route or an extension from the second route in more than a limit value, the circuitry is configured to control the automatic traveling vehicle to move backward to approach the second route.

5. The control apparatus according to claim 1, wherein the first route and the second route are straight and parallel to each other.

6. The control apparatus according to claim 5,
   wherein the automatic traveling vehicle travels in a first direction along the first route, and
   wherein the automatic traveling vehicle travels in a second direction opposite to the first direction along the second route.

7. A control apparatus for an automatic traveling vehicle, comprising:
   a position sensor to detect a vehicle position of the automatic traveling vehicle;
   a travel state sensor to detect a traveling direction of the automatic traveling vehicle at the vehicle position; and
   circuitry configured to
      control the automatic traveling vehicle to travel along a first route, and a first turn route connected to the first route in this order,
      repeatedly calculate a tangent extending from the vehicle position on the first turn route while the automatic traveling vehicle travels along the first turn route such that the tangent is tangent to a circle which is connected to a second route which is targeted after the first turn route and an angle between the tangent and a traveling direction of the automatic traveling vehicle as the automatic traveling vehicle travels along the first turn route until the angle is less than or equal to a first threshold angle, determine the tangent having the angle which is less than or equal to the first threshold angle as a reference tangent, calculate a second turn route along the circle between the reference tangent and the second route, and control the automatic traveling vehicle to travel along the reference tangent, the second turn route, and the second route in this order.

* * * * *